United States Patent
Benhase, Jr. et al.

(10) Patent No.: US 8,782,362 B2
(45) Date of Patent: *Jul. 15, 2014

(54) CYCLIC POINT-IN-TIME-COPY ARCHITECTURE WITH DATA DEDUPLICATION

(75) Inventors: Michael Thomas Benhase, Jr., Tucson, AZ (US); Theresa Mary Brown, Tucson, AZ (US); Lokesh Mohan Gupta, Tucson, AZ (US); Carol Santich Mellgren, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 13/043,416

(22) Filed: Mar. 8, 2011

(65) Prior Publication Data

US 2012/0233430 A1    Sep. 13, 2012

(51) Int. Cl.
*G06F 12/02* (2006.01)

(52) U.S. Cl.
USPC .................... 711/162; 711/165; 711/E12.002

(58) Field of Classification Search
USPC .................................. 711/162, 165, E12.002
See application file for complete search history.

(56) References Cited

U.S. PATENT DOCUMENTS

| | | | |
|---|---|---|---|
| 6,026,027 A | 2/2000 | Terrell, II et al. | |
| 6,721,820 B2 | 4/2004 | Zilberman et al. | |
| 6,895,415 B1 | 5/2005 | Rezaul Islam et al. | |
| 7,277,997 B2 | 10/2007 | Vincent | |
| 7,360,048 B2 | 4/2008 | Agombar et al. | |
| 7,472,242 B1 | 12/2008 | Deshmukh et al. | |
| 7,774,565 B2 | 8/2010 | Lewin et al. | |
| 7,788,244 B2 | 8/2010 | Xu et al. | |
| 7,797,358 B1 | 9/2010 | Ahal et al. | |
| 7,805,583 B1 | 9/2010 | Todd et al. | |
| 2004/0250034 A1* | 12/2004 | Yagawa et al. | 711/162 |
| 2004/0260882 A1 | 12/2004 | Martinez et al. | |
| 2008/0189482 A1* | 8/2008 | Fuente | 711/112 |
| 2009/0013140 A1 | 1/2009 | Bondurant et al. | |
| 2009/0089483 A1 | 4/2009 | Tanaka et al. | |
| 2009/0158086 A1 | 6/2009 | Kwon | |

(Continued)

OTHER PUBLICATIONS

Osuna, et al., IBM Corporation, "TS7680 Deduplication ProtecTIER Gateway for System Z," 2010, last accessed at: http://www.redbooks.ibm.com/abstracts/sg247796.html?Open.

(Continued)

*Primary Examiner* — Yong Choe
(74) *Attorney, Agent, or Firm* — Nelson and Nelson; Daniel P. Nelson; Alexis V. Nelson

(57) ABSTRACT

A method for performing a write to a volume x in a cyclic point-in-time-copy architecture is described. In one embodiment, such a method includes determining whether the volume x has a child volume. The method then determines whether the target bit maps (TBMs) of both the volume x and the child volume are set. If the TBMs are set, the method finds a higher source (HS) volume from which to copy the desired data to the child volume. Once the HS volume is found, the method determines whether the HS volume and the child volume are the same volume. If the HS volume and the child volume are not the same volume, the method copies the data from the HS volume to the child volume. The method then performs the write to the volume x. A corresponding computer program product is also described.

5 Claims, 9 Drawing Sheets

(56) References Cited

U.S. PATENT DOCUMENTS

| | | |
|---|---|---|
| 2009/0240869 A1 | 9/2009 | O'Krafka et al. |
| 2010/0031086 A1 | 2/2010 | Leppard |
| 2010/0088277 A1 | 4/2010 | Rao et al. |
| 2010/0162039 A1 | 6/2010 | Goroff et al. |

OTHER PUBLICATIONS

Jing, et al., "Design of Simple and High Speed VLSI Core for the Protection of Mass Storages," Circuits and Systems, pp. 1660-1663, 2008.

Mustacchi, Robert, "StashFS : Generalized Disconnected Operation," Computer Science Department, Brown University, Thesis, 2010.

Vmware, "Operational Aspects of Desktop Virtualization," 2009, last accessed at: http://vmware.com/files/pdf/view-operational-aspects.pdf.

USPTO Office Action, U.S. Appl. No. 13/043,389, Notification Date: Mar. 29, 2013.

Debnath et al., "ChunkStash: Speeding up Inline Storage Deduplication using Flash Memory," Microsoft Research, Proceedings of the 2010 USENIX conference, 2010.

EMC Corporation, "EMC's Information Infrastructure Portfolio," 2009.

IBM Corporation, "Storage Track—IBM Server Systems Technical Conference," 2009.

Haug, et al., "Integrating Mature Data Deduplication Technologies—Redefining the Backup/Recovery Paradigm," last accessed at: http://vmwarevforum2010.com/oslo/presentations/ATEA_Data_Domain.pdf, Mar. 23, 2010.

* cited by examiner

| Track | Target Volume 1 (TV1) | | Target Volume 2 (TV2) | | Source Volume (SV) | |
|---|---|---|---|---|---|---|
| | TBM | Extent Data | TBM | Extent Data | TBM | Extent Data |
| 1 | 1 | | 0 | TV2 Data | 1 | |
| 2 | 0 | SV Data | 1 | | 1 | Updated SV Data |
| 3 | 0 | SV Data | 1 | | 1 | Updated SV Data |
| 4 | 1 | | 0 | TV2 Data | 0 | |
| 5 | 0 | TV1 Data | 0 | SV Data | 1 | |
| 6 | 0 | SV Data | 1 | | 0 | Updated SV Data |

CYCLIC POINT-IN-TIME-COPY ARCHITECTURE WITH DATA DEDUPLICATION

BACKGROUND

1. Field of the Invention

This invention relates to data replication, and more particularly to apparatus and methods for creating point-in-time copies of data while minimizing data duplication.

2. Background of the Invention

Data replication functions such as IBM's Flash Copy, Hitachi's ShadowImage, or the like, may be used to generate nearly instantaneous point-in-time copies of logical volumes or data sets. Among other uses, these point-in-time copies may be used for disaster recovery and business continuity purposes. IBM's Flash Copy in particular creates a point-in-time copy by establishing a mapping relationship between a source volume and a target volume. Once this mapping relationship is established, data may be read from either the source volume or target volume. A target bit map associated with the target volume keeps track of which data tracks have actually been copied from the source volume to the target volume. In certain cases, volumes may be arranged in a cascaded configuration such that certain volumes function as both targets and sources. In other cases, volumes may be arranged in a flat (or "multi-target") configuration such that a source volume has mapping relationships with multiple target volumes.

Nevertheless, I/O performance can be impacted significantly as the number of volumes increases in either a cascaded or multi-target configuration. For example, in a cascaded configuration, a write to a source volume may need to wait for data to be copied between several volumes in the cascade before the write can be performed. Thus, the larger number of volumes in the cascade, the larger number of copies that may need to occur before data can be written to the source volume. Similarly, in a multi-target configuration, a write to a source volume may need to wait for data to be copied to each connected target before the write can be performed. The larger number of volumes in the multi-target configuration, the larger number of copies that need to occur before data can be written to the source volume. This can make a write to a source volume or other volumes in the cascade very slow. For this reason, current Flash Copy implementations typically only allow a limited number of targets in a multi-target configuration to keep the performance impact within an acceptable range.

In view of the foregoing, what are needed are methods to reduce the performance impact of having large numbers of volumes in cascaded or multi-target configurations. More specifically, methods are needed to reduce data duplication in cascaded or multi-target configurations when performing reads or writes thereto.

SUMMARY

The invention has been developed in response to the present state of the art and, in particular, in response to the problems and needs in the art that have not yet been fully solved by currently available apparatus and methods. Accordingly, the invention has been developed to provide methods for performing reads and writes to volumes in cyclic point-in-time-copy architectures. The features and advantages of the invention will become more fully apparent from the following description and appended claims, or may be learned by practice of the invention as set forth hereinafter.

Consistent with the foregoing, a method for performing a write to a volume x in a cyclic point-in-time-copy architecture is disclosed herein. In one embodiment, such a method includes determining whether the volume x has a child volume, wherein each of the volume x and the child volume have a target bit map (TBM) associated therewith. The method then determines whether the TBMs of both the volume x and the child volume are set, indicating that neither the volume x nor the child volume contains desired data. If the TBMs are set, the method finds a higher source (HS) volume from which to copy the desired data to the child volume. Finding the HS volume includes traveling up the cascaded architecture until the source of the data is found. Once the HS volume is found, the method determines whether the HS volume and the child volume are the same volume. If the HS volume and the child volume are not the same volume, the method copies the data from the HS volume to the child volume. The method then performs the write to the volume x. A corresponding computer program product is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 9 is a table showing data and TBM values for the volumes illustrated in FIG. 8 after various writes have been made thereto.

DETAILED DESCRIPTION

Figure 1:
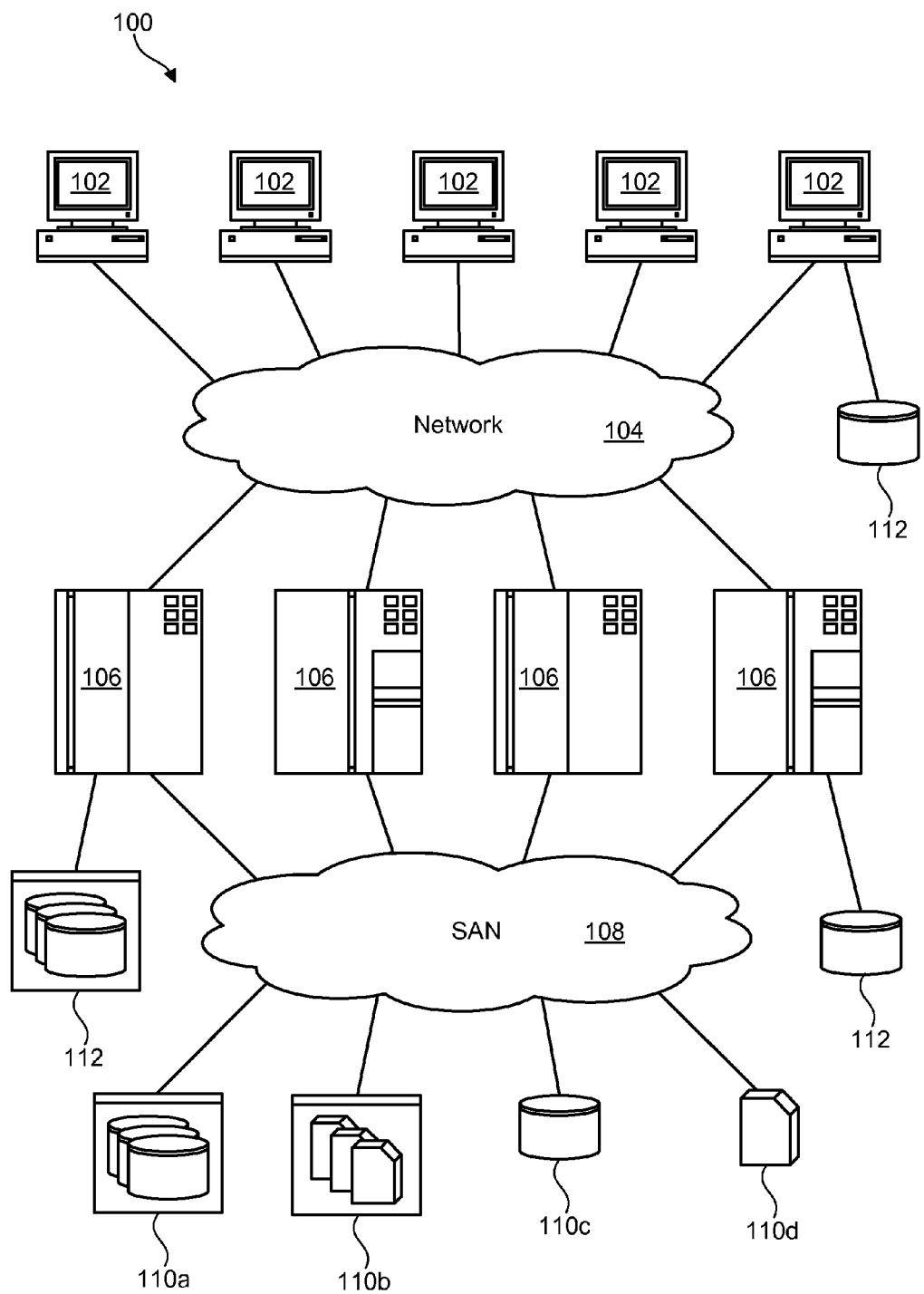
FIG. 1 is a high-level block diagram showing one example of a network architecture comprising various types of storage systems.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a point-in-time-copy methodology in accordance with the invention may be implemented. The network architecture 100 is presented only by way of example and not limitation. Indeed, the methodology disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the point-in-time-copy methodology disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the point-in-time-copy methodology disclosed herein.

Figure 2:
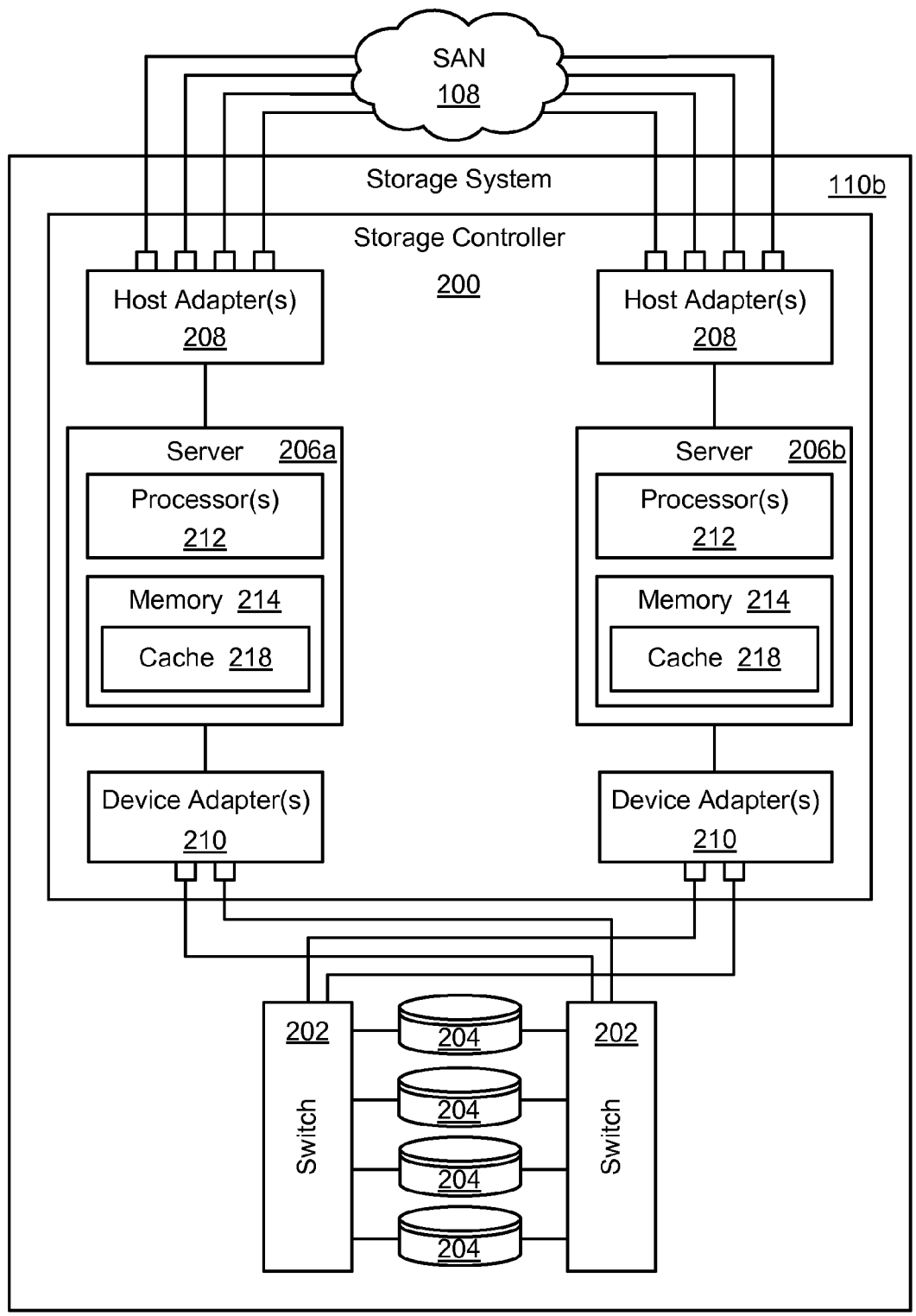
FIG. 2 is a high-level block diagram showing one example of a storage system where a methodology in accordance with the invention may be implemented.

Referring to FIG. 2, one embodiment of a storage system 110b containing an array of hard-disk drives 204 and/or solid-state drives 204 is illustrated. The internal components of the storage system 110b are shown since the point-in-time-copy methodology disclosed herein may, in certain embodiments, be implemented within such a storage system 110b, although the methodology may also be applicable to other storage systems 110. As shown, the storage system 110b includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 (e.g., an open system or mainframe server 106) performs a read operation, the server 206 that performs the read may fetch data from the storages devices 204 and save it in its cache 218 in the event it is needed again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218. The server 106 may then destage the write to the storage devices 204 as time and resources allow.

One example of a storage system 110b having an architecture similar to that illustrated in FIG. 2 is the IBM DS8000™ enterprise storage system. The DS8000™ is a high-performance, high-capacity storage controller providing disk storage that is designed to support continuous operations. Nevertheless, the methods disclosed herein are not limited to the IBM DS8000™ enterprise storage system 110b, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and is not intended to be limiting.

Figure 3:
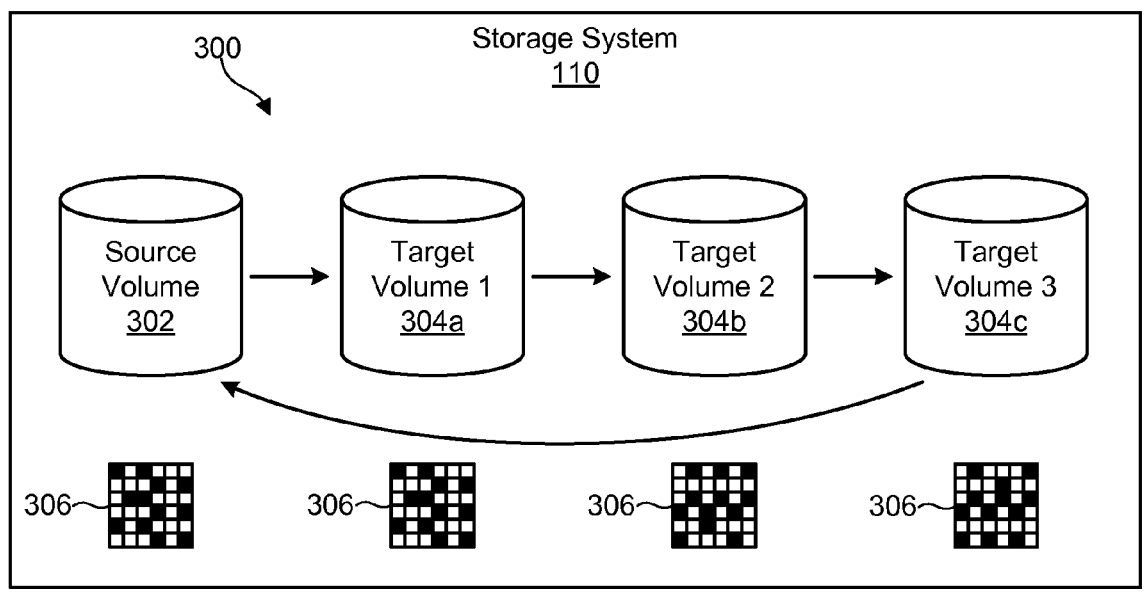
FIG. 3 is a high-level block diagram showing one example of a cyclic architecture comprising a source volume and multiple target volumes.

Referring to FIG. 3, one example of a cyclic architecture 300 for creating point-in-time copies is illustrated. Such an architecture 300 may be implemented within a storage system 110, such as the storage system 110b illustrated in FIG. 2. As shown, the cyclic architecture 300 includes a source volume 302 and one or more target volumes 304a-c arranged in a cascade, with the last target volume 304c in the cascade cycling back to the source volume 302. Some target volumes 304a, 304b may act as source volumes for downstream target volumes. For example, the target volume 304a is the source volume for the downstream target volume 304b, and the target volume 304b is the source volume for the downstream target volume 304c. Similarly, one or more target volumes 304 may act as a source for the source volume 302 (such as when the source volume 302 needs to be restored to a previous point-in-time), thereby completing the cycle. In such cases, the source volume 302 also acts as a target volume. In the illustrated example, the target volume 304c is the source for the source volume 302. Each target volume 304a-c contains a point-in-time copy of the data in the volume immediately upstream.

In selected embodiments, such as in Flash Copy implementations, a point-in-time copy is created by establishing a mapping relationship between a source volume 302 and a target volume 304. Once this mapping relationship is established, data may be read from or written to either the source volume 302 or the target volume 304 even though data may still not be copied from the source volume 302 to the target volume 304. A target bit map (TBM) 306 associated with each target volume 304 keeps track of which data tracks have actually been copied from the source volume to the target volume 304. For example, a "0" in the TBM 306 may indicate that a data track has been copied (i.e., the target volume 304 has its own data), whereas a "1" may indicate that a data track has not yet been copied. In cases where the TBM 306 contains a "1," a read to a track on the target volume 306 may be directed to the corresponding track on the source volume 302. For the purposes of this disclosure, a bit in a TBM 306 is said to be "set" if it contains a "1" and "reset" if it contains a "0," although this could be reversed in other embodiments.

As previously mentioned, in conventional cascaded architectures 300, a write to a source volume 302 may need to wait for data to be copied (i.e., destaged) to each target volume 304a-c in the cascade before the write can be completed on the source volume 302. In particular, before data can be written to a track of the source volume 302, the existing data in the track may need to be destaged (i.e., written) to the target volume 304a (assuming the TBM 306 of the target volume 304a is set). Similarly, before the write to the target volume 304a can occur, the data in the track may need to be destaged to the target volume 304b (assuming the TBM 306 of the target volume 304b is set). Similarly, before the write to the target volume 304b can occur, the data in the track may need to be destaged to the target volume 304c (assuming the TBM 306 of the target volume 304b is set). The larger the number of target volumes 304a-c in the cascade, the larger number of copies that may need to occur before data can be successfully written to the source volume 302. This can make a write to the source volume 302 or other volume 304 in the cascade very slow.

As will be explained in more detail hereafter, an improved methodology in accordance with the invention may reduce the performance impact of having large numbers of volumes in a cascade, such as in the cyclic architecture 300 shown in FIG. 3. Instead of requiring copies to propagate to each volume in the cascade, a direct copy is made between a higher source (HS) volume and a target volume 304 that needs to receive the data, effectively bypassing (i.e., skipping over) one or more intermediate target volumes 304. This can significantly reduce the number of copies that need to occur when a write is performed to a source volume 302 or target volume 304. This, in turn, enables larger numbers of volumes 302, 304 to be included in the cyclic architecture 300. The flow diagrams illustrated in FIGS. 4 through 7 show various specific examples of methods that may be used to implement such a methodology.

Figure 4:
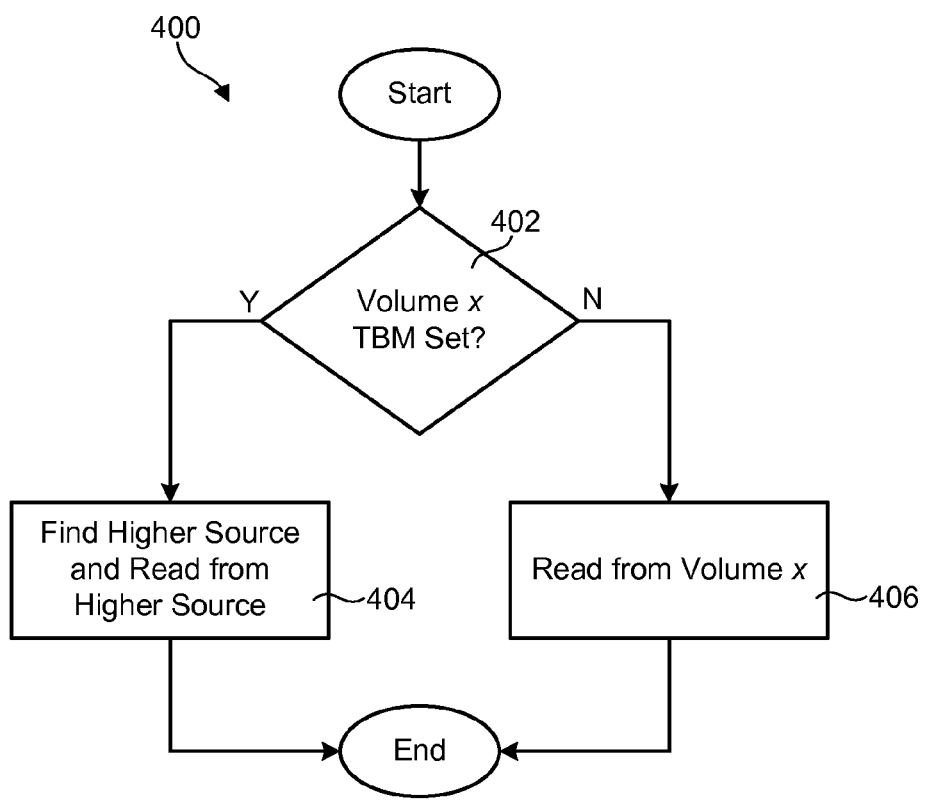
FIG. 4 is a high-level block diagram showing one embodiment of a method for reading a track from a volume.

Referring to FIG. 4, one example of a method 400 for reading a track from a volume 304 is illustrated. Upon receiving a request to read a data track from a volume (volume x), the method 400 determines 402 whether the TBM 306 of the volume 304 is set. If the TBM 306 is not set (indicating that the volume x is a target volume 304 that includes its own copy of the requested data) or there is no TBM 306 (indicating the volume is a source volume 302 only), the method 400 simply reads 406 the requested data track from the volume x. On the other hand, if the TBM 306 is set (indicating that the volume does not contain its own copy of the data), the method 400 finds 404 a higher source (HS) volume from which to read the data, and reads 404 the data from the HS volume. A method 600 for finding the HS volume is described in association with FIG. 6. For the purposes of this disclosure, the HS volume is the volume that contains the data to be read and from which volume x inherits.

Figure 5:
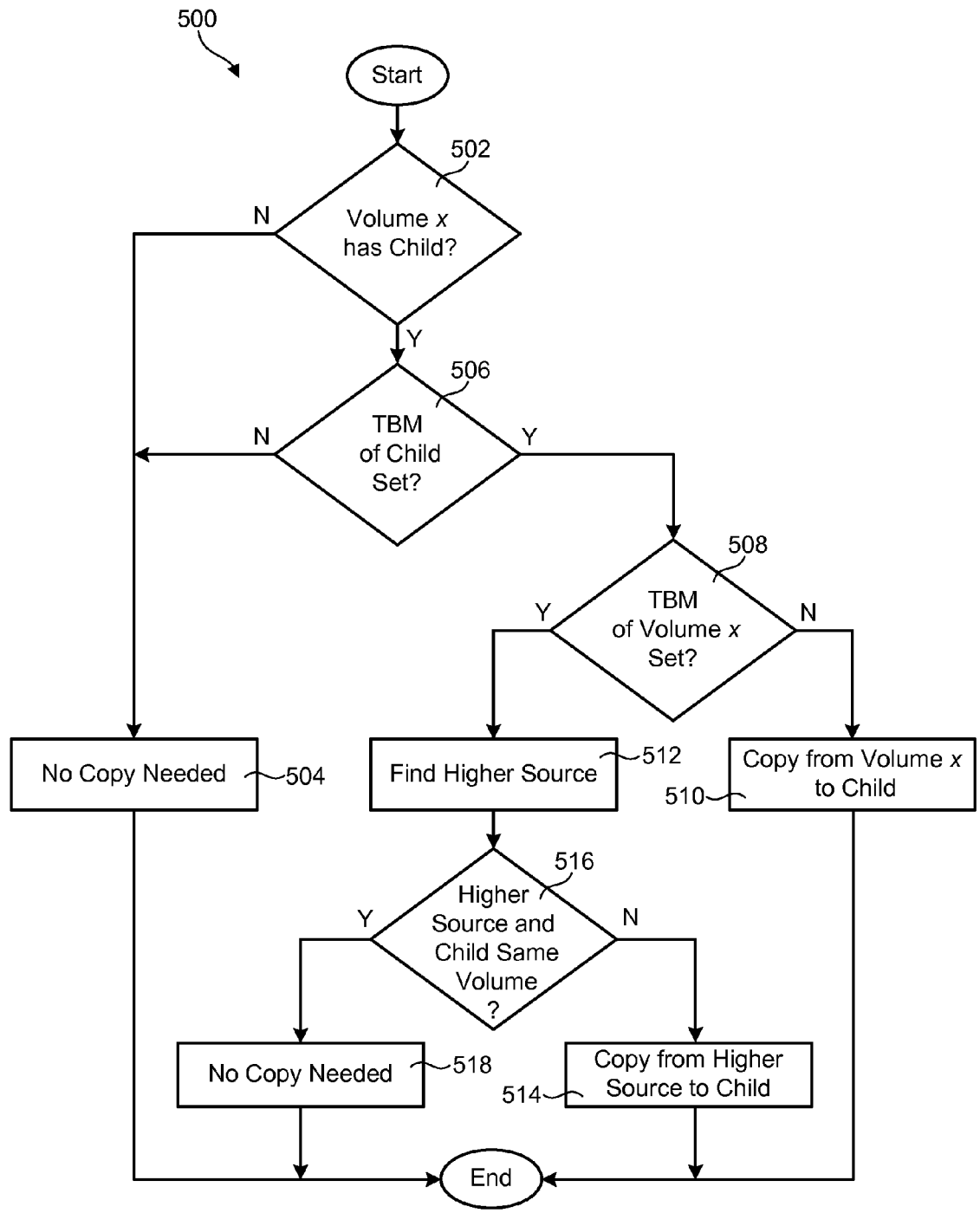
FIG. 5 is a flow diagram showing one embodiment of a method for copying a data track in response to a write to a volume.

Referring to FIG. 5, one embodiment of a method 500 for copying a data track in response to a write to a volume 302, 304 (volume x) is illustrated. As shown, the method 500 initially determines 502 whether the volume x has a child. For the purposes of this disclosure, a "child" is a downstream target volume 304 that is mapped to the volume x. If the volume x does not have a child, then no copy is needed as reflected at step 504 and the method 500 ends. If the volume x does have a child, the method 500 determines 506 whether the TBM 306 of the child is set in order to determine whether the child has its own copy of the data. If the TBM 306 of the child is not set (indicating that the child volume has its own copy of the data), then no copy is needed as reflected at step 504 and the method 500 ends.

If, on the other hand, the TBM 306 of the child is set (indicating that the child volume does not have its own copy of the data), then the method 500 determines 508 whether the TBM 306 of the volume x is set. If the TBM 306 of the volume x is not set or the volume x is a source volume 302 (no TBM 306), then the method 500 copies 510 the data in the track from the volume x to the child volume and the method 500 ends. If, on the other hand, the TBM 306 of the volume x is set, the method 500 finds 512 a higher source (HS) volume from which to copy the data. One method 700 for finding the HS volume from which to copy the data will be described in association with FIG. 7.

Once the HS volume is found, the method 500 determines 516 whether the HS volume and the child volume are the same volume. If they are not the same volume, the method 500 copies 514 the data from the HS volume to the child volume 304. If they are the same volume, no copy is needed as reflected at step 518.

Figure 6:
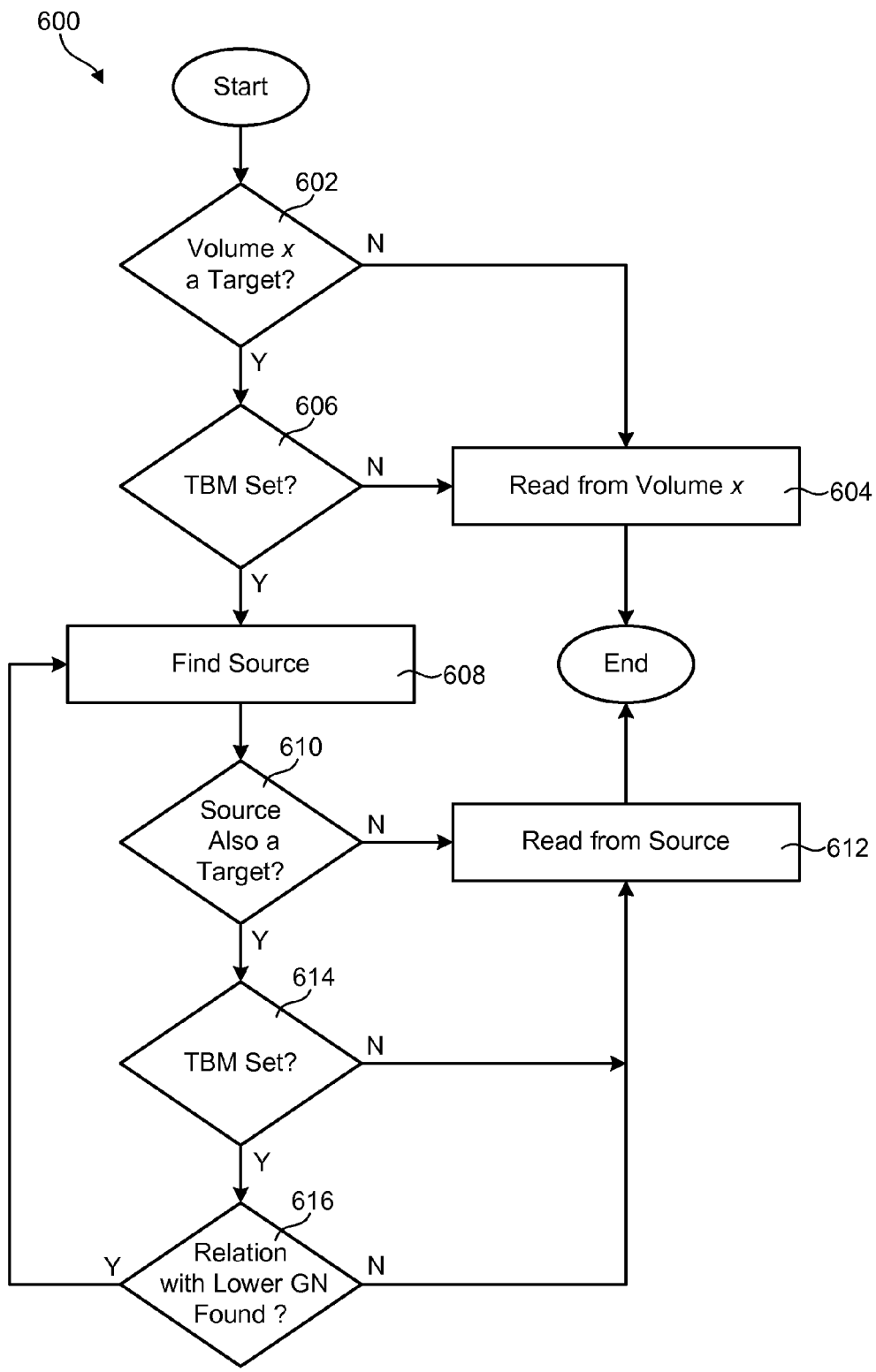
FIG. 6 is a flow diagram showing one embodiment of a method for finding a higher source (HS) volume in response to a read to a volume.

Referring to FIG. 6, one embodiment of a method 600 for finding a higher source (HS) volume in response to a read to a volume is illustrated. Such a method 600 may be used in association with step 404 of FIG. 4. As shown, the method 600 initially determines 602 whether the volume (volume x) being read from is a target volume 304. If not, the method 600 reads 604 from the volume x since it is a source volume 302. If the volume x is a target volume 304, the method 600 determines 606 whether the TBM 306 of the volume x is set. If the TBM 306 is not set, the method 600 reads 604 from the volume x 304 since it has its own copy of the data. If the TBM 306 of the volume x is set, the method 600 finds 608 the source volume associated with the volume x.

Upon finding 608 the source volume associated with the volume x, the method 600 determines 610 whether the source volume is also a target volume. If not, the method 600 reads 612 from the source volume and the method 600 ends. If the source volume is also a target volume, the method 600 determines 614 whether the TBM 306 of the volume is set. If the TBM 306 is not set, the method 600 reads 612 from the source volume (since the source volume contains the data to be read) and the method 600 ends.

If the TBM 306 of the source volume is not set, the method 600 determines 616 whether the source volume has a mapping relationship, with a lower generation number (GN), with an upstream source volume. As will be explained in association with FIG. 8, generation numbers (GNs) may be used to determine the order in which mapping relationships in the cyclic architecture 300 were created. In effect, the decision step 616 determines whether an upstream mapping relationship exists that was created prior in time to the downstream mapping relationship. If not, the method 600 reads 612 from the source volume 612 determined at step 608. If so, the method 600 finds 608 the next upstream source volume and repeats steps 610, 614, 616 in the manner previously described. In this way, the method 600 travels up the cascade until the HS volume containing the desired data is found. When the desired data is found, the method 600 reads the data. The decision step 616 essentially prevents the method 600 from circling through the cyclic architecture 300 multiple times.

Figure 7:
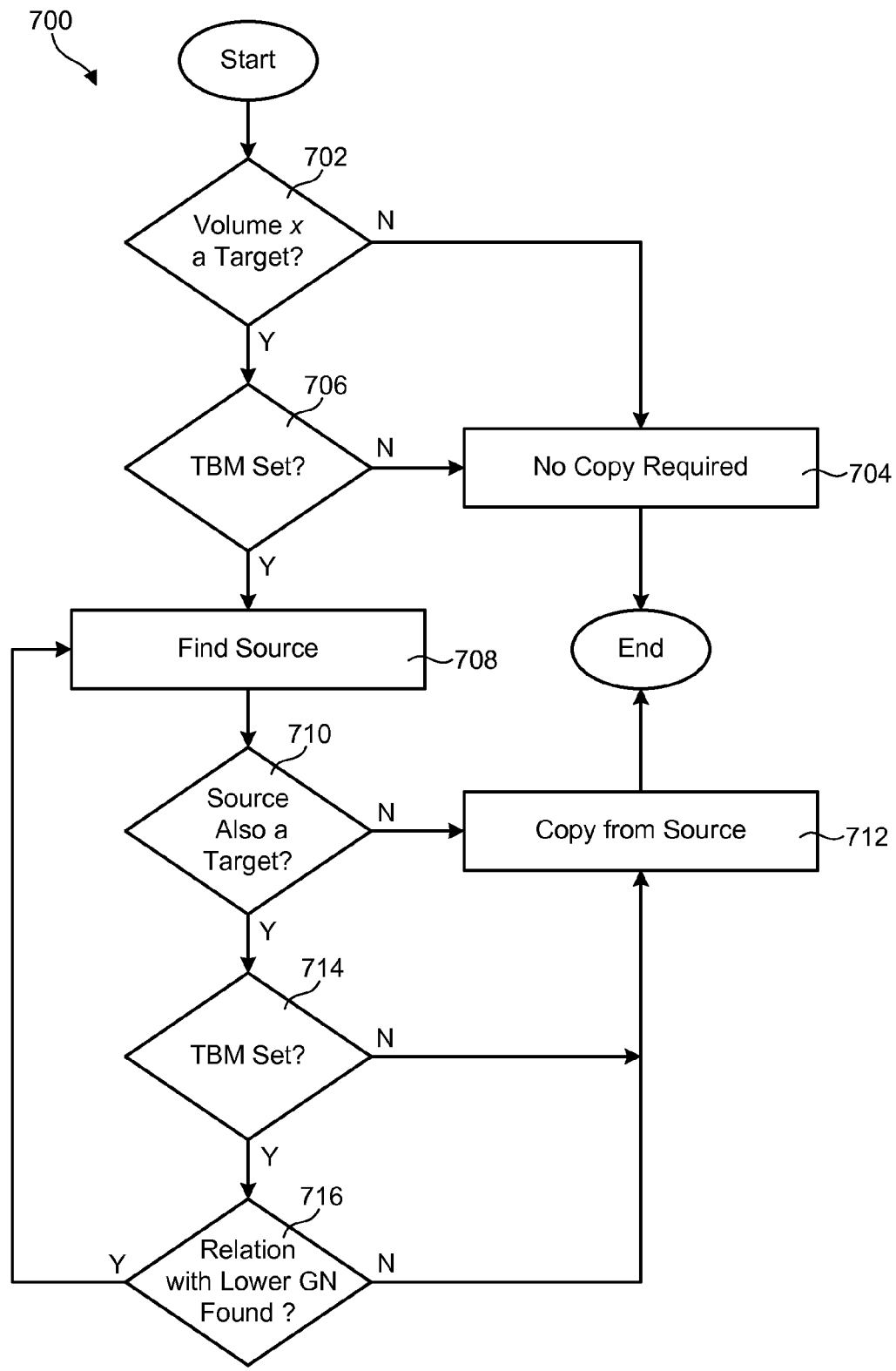
FIG. 7 is a flow diagram showing one embodiment of a method for finding a higher source (HS) volume from which to copy a data track in response to a write to a volume.

Referring to FIG. 7, one embodiment of a method 700 for finding a higher source (HS) volume from which to copy a data track in response to a write is illustrated. Such a method 700 may be used in association with steps 512, 514 of FIG. 5. As shown, the method 700 initially determines 702 whether the volume (volume x) being written to is a target volume 304. If the volume x is not a target volume 304, no copy is required as reflected at step 704. If the volume x is a target volume 304, the method 700 determines 706 whether the TBM 306 of the volume x is set. If the TBM 306 is not set, no copy is required as reflected at step 704. If the TBM 306 of the volume x is set, the method 700 finds 708 the source volume associated with the volume x.

Upon finding 708 the source volume associated with the volume x, the method 700 determines 710 whether the source volume is also a target volume. If not, the method 700 copies 712 the data 712 from the source volume. If the source volume is also a target volume, the method 700 determines 714 whether the TBM 306 of the source volume is set. If the TBM 306 of the source volume is not set, the method 700 copies 712 the data from the source volume (since the source volume contains the desired data). If the TBM 306 of the source volume is not set, then the method 700 determines 716 whether the source volume has a mapping relationship, with a lower generation number (GN), with an upstream source volume.

As will be explained in association with FIG. 8, the generation numbers (GNs) may be used to determine the order in which mapping relationships in the cyclic architecture 300 were created. In effect, the decision step 716 determines whether an upstream mapping relationship exists that was created prior in time to the downstream mapping relationship. If not, the method 700 copies 712 the data from the source volume. Otherwise, the method 700 finds 708 the next upstream source volume and repeats steps 710, 714, 716 in the manner previously described. In this way, the method 700 travels up the cascade until the volume containing the desired data is found. Once found, the method 700 copies 712 the data from the volume. The decision step 716 prevents the method 700 from circling through the cyclic architecture 300 multiple times.

Figure 8:
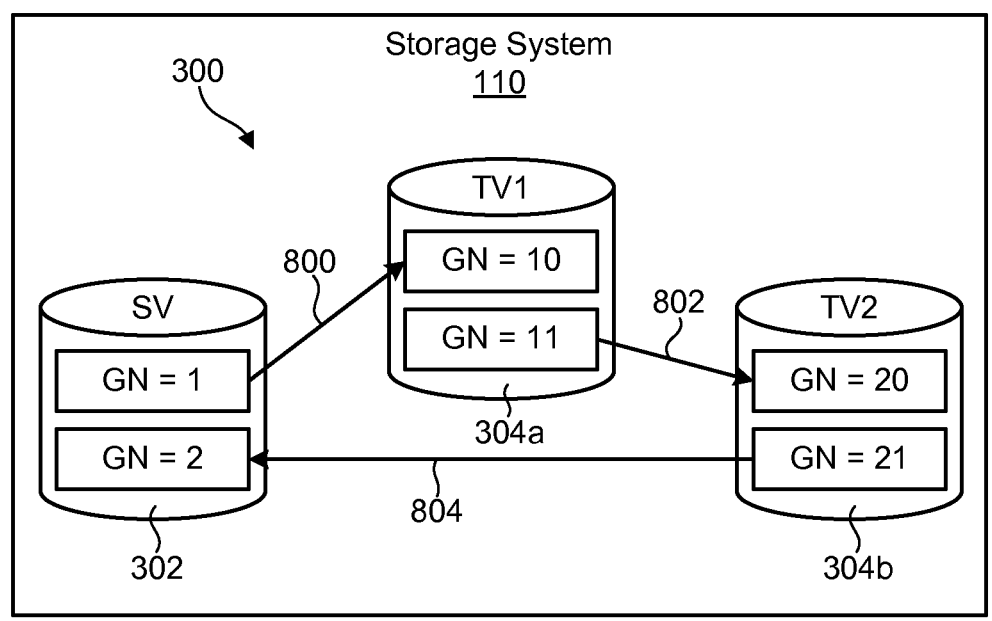
FIG. 8 is a high-level block diagram showing a cyclic architecture and the use of generation numbers.

Referring to FIG. 8, one example of a cyclic architecture 300 showing the use of generation numbers (GNs) is illustrated. As shown in the cyclic architecture 300 of FIG. 8, a mapping relationship 800 exists between a source volume (SV) 302 and a first target volume (TV1) 304*a*, a mapping relationship 802 exists between the first target volume (TV1) 304*a* and a second target volume (TV2) 304*b*, and a mapping relationship 804 exists between the second target volume (TV2) 304*b* and the source volume 302, thereby completing the cycle. Each mapping relationship has associated therewith two GNs—one for the source volume and one for the target volume. Each time a mapping relationship is established with a volume, the generation number on the volume is incremented. Accordingly, by inspecting the generation numbers on a volume, the order in which the mapping relationships were created may be determined. For example, as indicated on the first target volume 304a, the mapping relationship 800 is associated with the GN of "10", while the mapping relationship 802 is associated with the GN of "11." These numbers indicate that the mapping relationship 800 was created prior to the mapping relationship 802.

The following paragraphs describe several non-limiting examples of writes to the cyclic architecture 300 using the methods illustrated in FIGS. 4 through 7:

Assume that mapping relationships 800, 802 are initially established between the source volume 302 and the first target volume 304a, and the first target volume 304a and the second target volume 304b, but the mapping relationship 804 between the second target volume 304b and the source volume 302 is not yet established. To perform a write to track 1 of the second target volume 304b, no copy is required since the second target volume 304b has no child. The write is performed to track 1 of the second target volume 304b and the TBM 306 of the second target volume 304b is reset. Similarly, to perform a write to track 2 of the source volume 302, the data in track 2 is copied from the source volume 302 to the first target volume 304a and the TBM 306 of the first target volume 304a is reset (indicating that it now contains the data). The write is then performed to track 2 of the source volume 302.

Assume that a third mapping relationship 804 is now established between the second target volume 304b and the source volume 302. To perform a write to track 3 of the source volume 302, the data in track 3 is copied from the source volume 302 to the first target volume 304a and the TBM 306 of the first target volume 304a is reset. The write is then performed to track 3 of the source volume 302. To perform a write to track 4 of the second target volume 304b, no copy is required since the source volume 302 (the higher source) is the same as the child volume. Although no copy is required, the TBM 306 of the source volume 302 is reset. The write is then performed to track 4 of the second target volume 304b and the TBM 306 of the second target volume 304b is reset.

To perform a write to track 5 of the first target volume 304a, the data in track 5 is copied from the source volume 302 (the higher source) to the second target volume 304b and the TBM 306 of the second target volume 304b is reset. The write is then performed to track 5 of the first target volume 304a and the TBM 306 of the first target volume 304a is reset. To perform a write to track 6 of the source volume 302, the data in track 6 is copied from the source volume 302 to the first target volume 304a and the TBM 306 of the first target volume 304a is reset. The write is then performed to track 6 of the source volume 302 and the TBM 306 of the source volume 302 is reset. The data residing in the first target volume (TV1) 304a, second target volume (TV2) 304b, and source volume 302 after all six writes described above is shown in FIG. 9. The values in the TBMs 306 for each of these volumes are also shown.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product for performing a write to a volume x in a cyclic point-in-time-copy architecture, the computer program product comprising a non-transitory computer-readable storage medium having computer-usable program code embodied therein, the computer-usable program code comprising:

computer-usable program code to determine whether the volume x has a child volume, wherein each of the volume x and the child volume have a target bit map (TBM) associated therewith;

computer-usable program code to determine whether the TBMs of both the volume x and the child volume are set:

computer-usable program code to, if the TBMs are set, find a higher source (HS) volume from which to copy data to the child volume, wherein finding the HS volume comprises finding a source volume associated with the volume x, determining a downstream mapping relationship between the source volume and the volume x, and determining if an upstream mapping relationship from the source volume was created after the downstream mapping relationship, wherein the source volume is determined to be the HS volume if the upstream mapping relationship from the source volume was created after the downstream mapping relationship;

computer-usable program code to determine whether the HS volume and the child volume are the same volume;

computer-usable program code to copy the data from the HS volume to the child volume if the HS volume and the child volume are not the same volume; and computer-usable program code to perform the write on the volume x.

2. The computer program product of claim 1, wherein the downstream mapping relationship is defined by a generation number (GN) associated with the volume x and a generation number (GN) associated with the source volume.

3. The computer program product of claim 1, further comprising computer-usable program code to determine that the source volume is the HS volume if at least one of the following is true:

(a) the source volume is not also a target volume; and (b) a TBM associated with the source volume is not set.

4. The computer program product of claim 1, further comprising computer-usable program code to, if the TBM of the child volume is set and the TBM of the volume x is not set, copy data from the volume x to the child volume.

5. The computer program product of claim 1, further comprising computer-usable program code to, if the TBM of the child volume is not set, not copy data to the child volume.

* * * * *